May 28, 1957 A. C. RUGE 2,793,851
LOAD CELL SUPPORT FOR WEIGHING APPARATUS
Filed July 23, 1953 3 Sheets-Sheet 1

INVENTOR
ARTHUR C. RUGE
BY
ATTORNEY

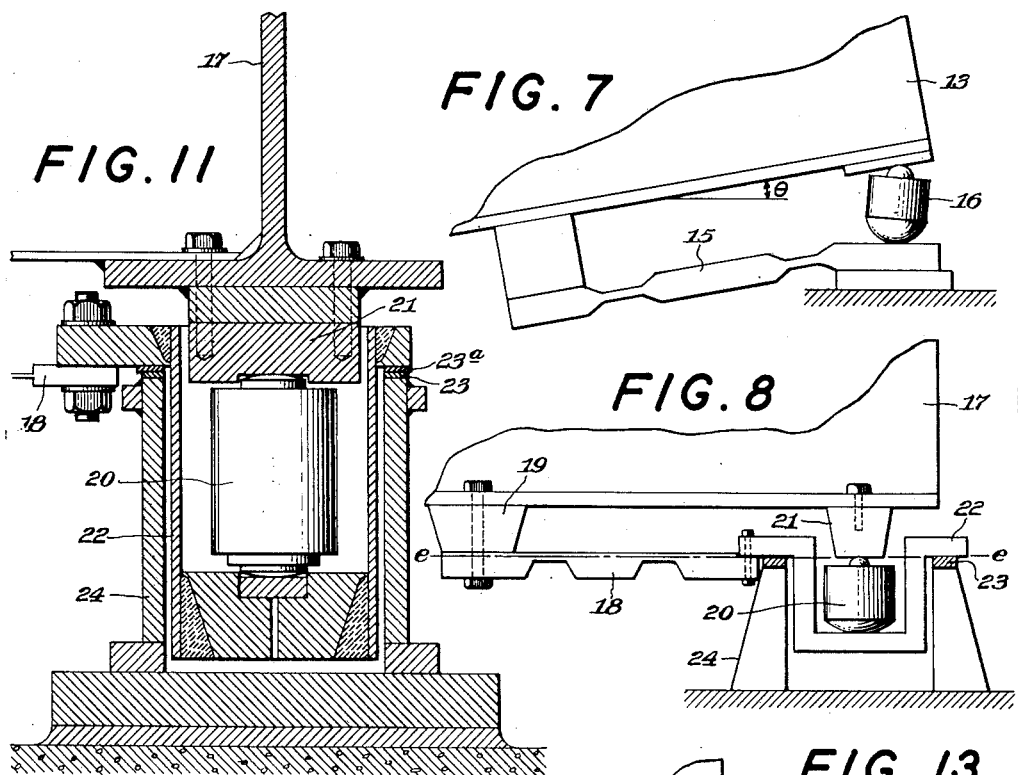

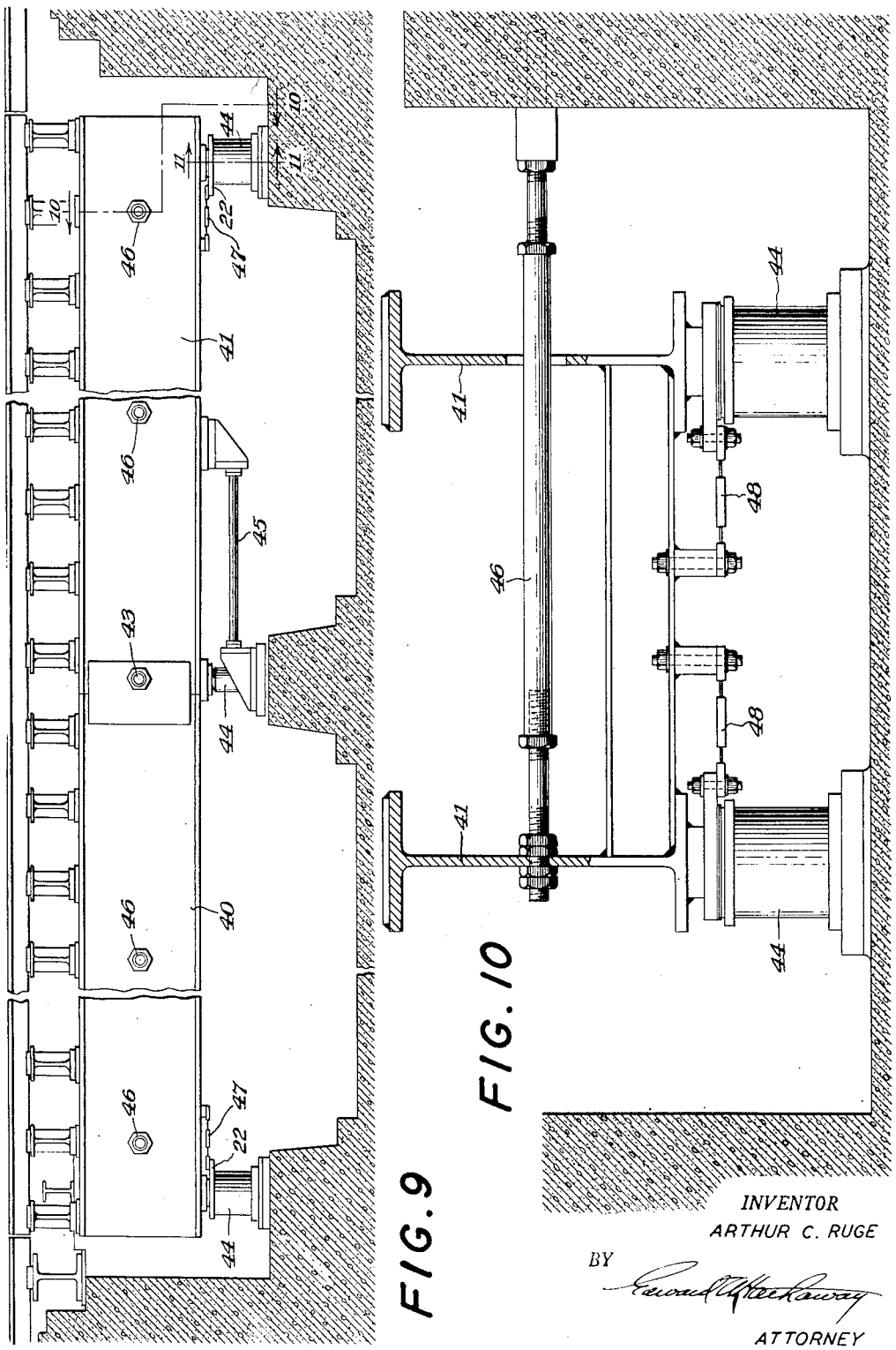

United States Patent Office 2,793,851
Patented May 28, 1957

2,793,851

LOAD CELL SUPPORT FOR WEIGHING APPARATUS

Arthur C. Ruge, Cambridge, Mass., assignor to Baldwin-Lima-Hamilton Corporation, a corporation of Pennsylvania Application July 23, 1953, Serial No. 369,938

15 Claims. (Cl. 265—71)

This invention relates generally to load weighing apparatus and more particularly to apparatus employing a relatively large structure such as platforms for truck weighing scales and railway track scales as well as large bulk weighing containers and many other types of large weighing structures.

In conventional weighing systems, particularly of the mechanical types, expansion, contraction, and deflection have to be taken care of by supporting the weighing structure on links or hinged members which take up the movement of the structure so as to prevent the transmission of substantial transverse forces to the load sensing device. Such suspensions are cumbersome and expensive, especially where large loads are involved, and in most cases either take up an undesirable amount of head room or lead to complication of design, or both.

In my present invention the load weighing structures are supported upon load weighing cells of the electric force-sensitive type preferably employing bonded wire strain gages mounted on a member that is strained in proportion to the load to be weighed.

It is an object of my present invention to provide means for supporting a load cell on which is mounted a large weighing structure and to provide for normal expansions, contractions, and deflections of such structure without requiring supporting linkages or rolling support means as heretofore used in the prior art, thereby reducing the cost and complication of design and especially reducing maintenance costs without sacrificing the high degree of accuracy, sensitivity, and reliability of the load cells.

Another object is to so support a relatively rigid load cell that its load indication is substantially unaffected by the normal movements of the supported structure while still transmitting the load direct to the cell without requiring the interposition of any hinged or rolling motion take-up devices between the structure, load cell, and the load cell support.

It is a further object to provide a load cell support which achieves these advantages in a minimum of space.

Other objects and advantages will be more apparent to those skilled in the art from the following description of the accompanying drawings in which:

Fig. 7 is still another modification of Fig. 4, the load cell being provided with spherical ends to act as a rocker;

Fig. 8 is a further modification that almost entirely eliminates the tendency to apply transverse forces to the load cell;

Fig. 9 is a schematic side elevation of a railroad track scale in which my load cell expansion support is shown applied;

Fig. 10 is an enlarged transverse section taken approximately along line 10—10 of Fig. 9;

Fig. 11 is an enlarged sectional view of my load cell expansion support made in accordance with the principles of the modification of the invention shown in Fig. 8 for use with the railroad track scale of Figs. 9 and 10 and taken substantially on line 11—11 of Fig. 9;

Figs. 12 and 13 show a further modification where the push-pull member is located in a plane other than one below the load cell; and Fig. 14 is a final modification employing tension rods to effect the push-pull action.

Figures 1, 2:
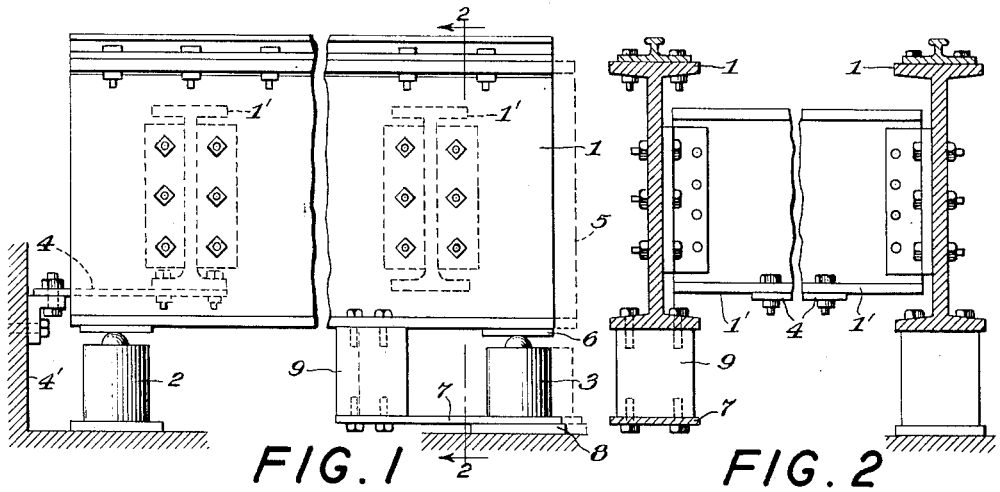
Fig. 1 is a side elevation of an elementary form of a railway track scale platform used in conjunction with load cells in accordance with my invention.
Fig. 2 is a transverse section taken on line 2—2 of Fig. 1.

In the particular embodiments of the invention which are disclosed herein for the purpose of illustrating the invention, I show in Figs. 1 and 2 an elementary form of the invention which is well suited to certain applications. A pair of longitudinal structural beam members 1 rigidly cross connected together by structural members 1' represent a load carrying structure which for purposes of illustration might be the load carrying members of a railroad track scale. Each member 1 is supported at its ends by two load cells, 2 and 3, which serve to weigh the vertical reactions produced by the weight carried by it. The load cells disclosed herein in the several modifications may be considered for purposes of illustration as any one of those shown in Patents Nos. 2,472,047; 2,561,318; and 2,576,417, among possible others. The members 1 are stayed longitudinally by a tie rod or stay plate 4 disposed between a foundation 4' and member 1', the plate being vertically flexible but horizontally rigid to fix the location of the left end of the members and to take up horizontal forces such as may be produced by braking action of railroad cars when stopped on the scale.

With such an arrangement, a change of temperature will cause the right hand end of members 1 to expand to some position 5. Only one member 1 and its load cells will be considered at this point as the other side is a duplicate. In order to provide for the foregoing expansion, load cell 3 bears against member 1 through a bearing plate 6 and is supported at its base on a flexible member such, for example, as a flexure plate 7. This plate transmits the vertical force acting on load cell 3 to a foundation or base plate 8. The other end of flexure plate 7 is rigidly attached to member 1 by block 9.

It is seen that as member 1 expands to position 5 there is a sliding action between members 7 and 8. In practice, the sliding surfaces of 7 and 8 are normally made smooth and are lubricated to minimize friction. In some cases one surface may be stainless steel while the other may be bronze which gives a low co-efficient of friction in a corrosion resistant combination which need not be lubricated.

A remarkable feature of the arrangement shown in Figs. 1 and 2 is that, while a relative large amount of friction may be generated due to the sliding of member 7 on plate 8, the load cell 3 which senses the load is substantially unaffected regardless of the magnitude of the friction.

The basic principle of this embodiment of the invention is seen to be as follows: at one end, the load cell engages the load carrying structure so that the load is transmitted directly to it; at the other end, the load cell engages a member which is tied to the structure in such a way that the cell is forced to follow motions of the structure in a given direction, thus causing the load cell to travel bodily with the motions of the structure at the point where load is to be measured, the member being adapted to transmit the load from the load cell at its point of engagement with it to a fixed support through an engagement capable of accommodating the motions of the structure, by sliding or rolling action.

Figures 3, 4:
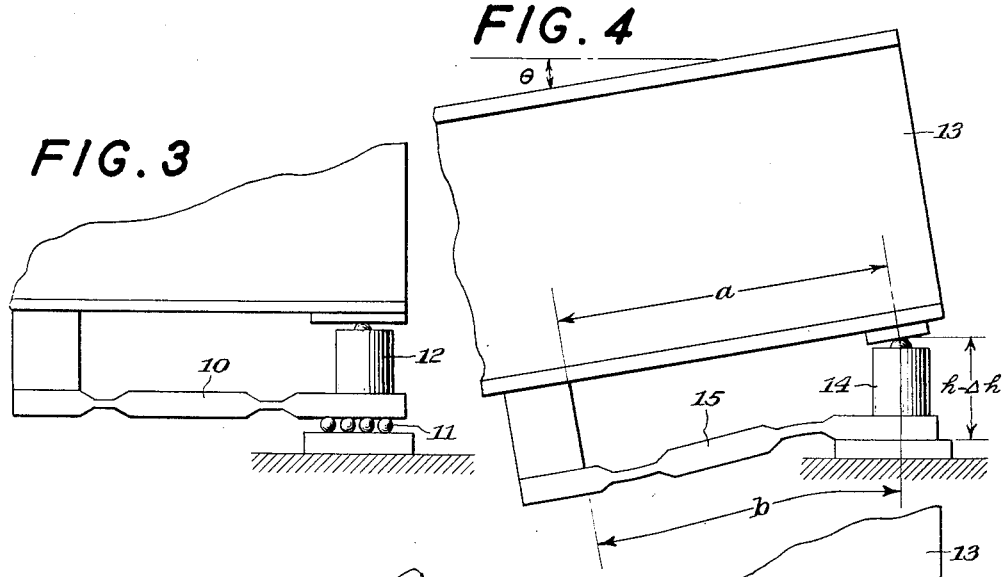
Fig. 3 is a modification of Fig. 1, but employing rollers instead of sliding action between members and introducing a preferred design of push-pull plate.
Fig. 4 is another modification designed for relatively flexible structures that when loaded assume an angle relative to their original positions.

Fig. 3 shows an embodiment of the idea disclosed in Figs. 1 and 2 but employing rollers instead of sliding action between members 10 and 11 which correspond to members 7 and 8 in Fig. 1. In this figure the member 10 is also shown in a preferred design of a push-pull plate which forms the same function as member 7 in Fig. 1 but has the advantage of being more flexible vertically for a given resistance against compression buckling and thus having still less influence on the load transmitted to the cell 12 as will be explained below.

Up to this point, I have described the invention in terms of a rigid structure and a rigid load cell, ignoring the fact that there is always some deflection to both when loads are imposed upon them. Also, there is always some deflection of the foundation which carries the reaction of the structure. In many applications these deflections are sufficiently small that the arranements shown in Figs. 1, 2 and 3 are perfectly sasisfactory and a high degree of weighing accuracy is achieved. In some applications, however, the deflections become large enough so that they cannot be safely ignored where the best weighing accuracy is required.

This situation is illustrated in Fig. 4 in which it is assumed that the structure 13 is relatively flexible or limber, so to speak, with the result that when loaded it assumes an angle $\theta$ relative to its original unloaded position. For purposes of illustration the angular deflection of member 13 is shown greatly exaggerated, whereas in practical construction it would normally be extremely small and not visible to the unaided eye. The load cell 14 also undergoes a deflection from an original height $h$ to a new height $h$ minus $\Delta h$. This deflection is in the case of most strain gage load cells a matter of only a few thousandths of an inch. It will be seen from the geometry of the figure that while the distances $a$ and $b$ are equal before deflection, after deflection the distance $a$ will be greater than the distance $b$ by approximately the amount $h \tan \theta$ assuming that the load cell is rigid so as to withstand the necessary distortion or that the load button has slid on the upper bearing plate enough to accommodate the change in geometry as a result of load. It should be understood that the distance $b$ measured along member 15 is substantially unchanged as a result of deflection since $\theta$ will be a very small angle. The result is that either load cell 14 will have to distort to fit the new geometry or it will have to fit it by undergoing a motion relative to members 13 and 15. Normally, if the cell is attached firmly to member 15 it will assume the new position by sliding action relative to member 13. For very small deflections this situation can be tolerated since the load cell can always distort a very small amount and also can move by sliding action without introducing appreciable errors provided it is properly designed.

Figures 5, 6:
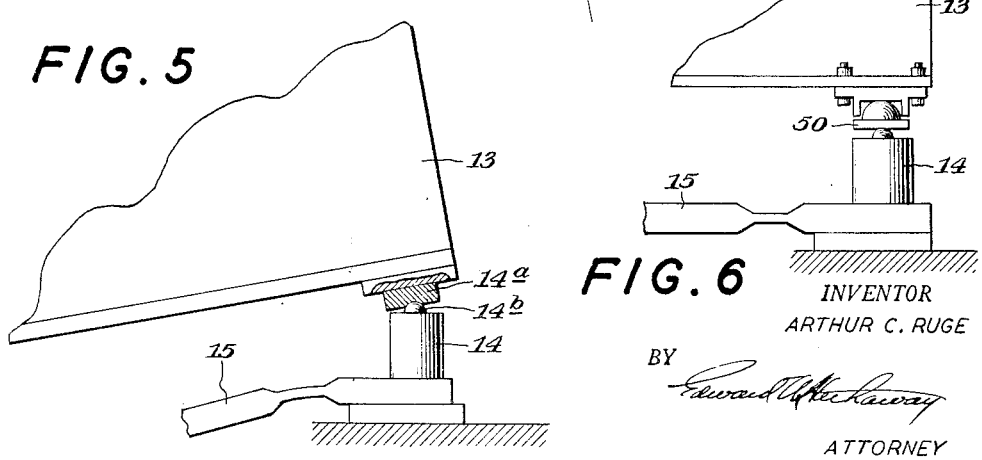
Fig. 5 is a further modification showing a practical method of allowing the load cell to slide against the supported structure.
Fig. 6 is a still further modification employing a rocker interposed between the load cell and the supported structure.

Fig. 5 shows one practical method of allowing member 13 to slide relative to load cell 14. To do this member 13 slides on a plate 14a which has an indentation to receive and hold the spherical end 14b of load cell 14. Fig. 6 shows a rocker 50 which can be interposed between load cell 14 and member 13 to allow for the small relative motion involved. The sliding action taking place in Fig. 5 produces a side force on the load cell which may or may not be tolerable depending upon the characteristics of the load cell under side force and the accuracy requirements. I have built and tested electrical load cells which will take a side force of as much as 15 percent of the axial force without showing more than 1/10 percent error in the indicated axial load. Therefore, it may be seen that the sliding action can in many cases be tolerated.

With the aid of the rocker 50 shown in Fig. 6, the effect of side load is substantially eliminated and results of the highest accuracy may be obtained. It must be recognized here that the relative motion $h \tan \theta$ is very small relative to the expansion and contraction motions of the supported structure which are taken care of by member 15 which forces load cell 14 to move bodily with the structure member 13.

Fig. 7 is another variation of Fig. 4 and shows an arrangement which I have found very effective. In this arrangement the load cell 16 is provided with spherical or cylindrical ends so that it can itself act as a rocker and take up whatever relative motion there is between members 13 and 15 as a result of deflection of member 13. Again, it has to be remembered that while I have shown the distortion greatly magnified, the rocking action of cell 16 is actually extremely small, with the result that the component of the load acting axially of the cell is to all intents and purposes equal to the true vertical load transmitted by the structure. In order to give a concrete example, in a 36 foot span railroad track scale girder which has been built employing the principles of this invention the angle $\theta$ at maximum load amounts to 1/4 degree, the corresponding value of $h \tan \theta$ where $h$ equals eight inches is therefore approximately 1/30 inch, while the expansion range of the structure amounts to about 1/4 inch from winter to summer.

Before proceeding to describe the improved embodiments of the invention shown in Fig. 8, a further discussion of the possible errors involved in the above described embodiments will be helpful. Referring to Fig. 4, it may be seen that the deflection $\Delta h$ of the load cell itself has an effect upon the indicated load. When the load cell changes length it causes a small amount of bending of the flexure plate 15, thereby changing the load transmitted to cell 14. It will be seen that this effect is not an "error" but merely an effect upon the calibration of the weighing system. The flexure plate 15 is normally designed so as to be as flexible as possible and yet have strength to push and pull the load cell as the structure changes dimensions. What bending stiffness it has comes into the calibration as an elastic effect and therefore can be calibrated out substantially perfectly.

A more important effect of the systems which have been described above is errors produced in the reading as a result of transverse forces acting on the load cell in Figs. 4 and 5, or angling of the force in Figs. 6 and 7. The transverse forces produced by friction cannot be calibrated out because friction is not sufficiently reproducible. Therefore, there will be cases where the rigidity of the structure is insufficient to make the deflections negligible, where highest accuracy is required and where the embodiments shown above may not be sufficiently perfect in their action. In this connection, it has to be understood that accuracy requirements in weighing applications vary greatly depending upon the purpose of the weighing. For instance, there are many weighing applications where an inaccuracy of ±2 or 3 percent of scale capacity is quite tolerable, such as in the check weighing of inexpensive bulk materials for inventory purposes. On the other hand, in the weighing of relatively expensive commodities such as cattle and grain inaccuracies greater than 1/20 percent of the actual weight may be intolerable. In the refinement to be described below we are concerned only with weighing applications where the very highest accuracies are required and where these accuracies are required over a wide range of weight on the same scale. Thus it will be seen that the scale designer has a wide latitude of choice in applying the principles of this invention to any particular weighing application. He takes into consideration the rigidity of the supported structure, the expansions and contractions that will occur under actual operating temperatures of the system, and the accuracy requirements, choosing the simplest and most economical embodiment which will meet all of the requirements.

Fig. 8 shows an improved embodiment of the present invention still using the type of structure employed in Fig. 1 by way of illustration. Member 17 corresponds to member 1 in Fig. 1, and the end of the structure shown in Fig. 8 is assumed to be the moving or expanding end as was the case in Fig. 1. Load cell 20 engages the structure 17 through member 21 which may be a block for purposes of illustration. The other end of load cell 20 engages a member comprising 18 and 22 and taking the place of member 7 in Fig. 1. This member is tied to the structure 17 by means 19 which again may be a block welded or bolted to 17 and 18. Member 18 is in the form of a flexure plate and is attached by bolts or other force transmitting means to member 22 which supports the load cell and transmits its reaction to base plates 23 which, in turn, rest on foundation 24. Member 22 engages member 23 through a slideable contact and in practice especially selected sliding material may be used as shown in Fig. 11 which is the detail of an actual construction. Member 22 may be a U-shaped structure or it may be a member shaped like a stove pipe hat, in which case member 23 is ring shaped.

Now, the essential difference between the improvement shown in Fig. 8 and the embodiments described before is that in Fig. 8 I place the elastic center line of push-pull member 18, the sliding surface between members 22 and 23, and the point of engagement between load cell 20 and block 21 all substantially in one horizontal plane, indicated by broken line e—e. In this way I avoid the difficulties which were discussed in connection with the embodiment shown in Figs. 1 through 7 because the tendency to rock the load cell or to apply transverse forces to it is almost entirely eliminated thereby. This is easily visualized by referring to Fig. 4 and considering that the dimension $\Delta h$ is reduced to zero when the elastic center line of member 18, the sliding surface between members 22 and 23, and the engagement point between load cell 20 and block 21 all lie in a single horizontal plane.

When the structure 17 of Fig. 8 assumes an angle relative to the horizontal as a result of loading, it will be seen that any tendency to rock load cell 20 or produce side forces on it is a second or higher order effect. To provide for what little of such action there would be, I prefer to provide load cell 20 with spherical or cylindrical surfaces at top and bottom.

It will be recognized that I could as well use rolling action between member 22 and the foundation. Also, the flexure plate 18 could just as well be a round rod or tube of suitable section. In fact, the invention is by no means limited to the specific constructions here illustrated, as will be evident to anyone skilled in the art. Furthermore, while I have chosen to illustrate the principles with compression load cells, it should be realized that the invention is applicable to a great variety of load sensing elements, whether they be mechanical, elastic, hydraulic, or pneumatic. The load cell used in illustrating the principle is of the elastic type with electrical strain gage indication of load. Another applicable elastic device is the well known proving ring, while a variety of pneumatic and hydraulic load cells which are available on the market could be employed here. Mechanical weighing devices such as conventional lever type scales may be used as well.

It should also be noted the invention is by no means limited to the use of compression type load sensing devices. Obviously, the load can equally well be carried by a tension sensing device such, for example, as shown in Patent No. 2,576,417 which merely requires simple adapter elements. All of the same principles which have been discussed here will apply to such tension application.

In order to give a clear picture as to how the principles of this invention are employed in the design of a complete weighing system, a schematic drawing of an actual railroad track scale is shown in Figs. 9, 10 and 11. This is a 400,000 pound capacity track scale having a total length of 72 feet. The span is made up of two 36 foot span girders 40, 41 on each side, the girders being pivoted together at the middle by a bolt connection 43 so that the total weight of the bridge is supported on six strain gage load cells 44, three on each side. Longitudinal stay rods 45 tie the center of the span relative to the foundation and serve to take up any length-wise forces such as those due to braking action. The middle load cells are therefore simply carrying vertical reactions and do not require any elaborate support system since there is substantially no motion at that point. They are adapted for rocking action, as cell 16 in Fig. 7, to take up what little motion exists as a result of unavoidable motions at the middle point. The two ends of the bridge are provided with load cell supports made in accordance with the embodiment of this invention shown in Fig. 8 and the details shown in Fig. 11, the parts of Fig. 11 corresponding to those of Fig. 8 being given the same reference numerals. From summer to winter, the ends of the bridge move longitudinally approximately ¼ inch in this particular structure. In longer structures and under more severe weather conditions the movements would be correspondingly larger and might easily be as much as one inch.

Also shown in the figures are the lateral stay rods 46 which fix the bridge against sidewise motion but have sufficient vertical flexibility to permit free weighing movement of the bridge through a few thousandths of an inch. In order to provide for such small expansion as there is laterally, the sliding load cell supports at the ends are so arranged that the load cells follow the motion of the structure in either direction. That is, there are two flexure plates connected to member 22, Fig. 11 at each load cell expansion support, one flexure plate 47, Fig. 9, disposed longitudinally of the railroad track scale, the other flexure plate 48, Fig. 10, disposed transversely of the track scale. Base plate 23 of Fig. 8 consists in Fig. 11 of two rings 23 and 23a, one of stainless steel, the other of bronze, which, as stated above, gives a low coefficient of friction in a corrosion resistant combination and no lubrication is required. Member 22, instead of being U-shaped, as shown in Fig. 8, is cup-shaped with an upper flange or like an inverted stove pipe hat.

In order to weigh the total load on the bridge, the electrical outputs of the six load cells are added in series in a well known manner and with the addition of the refinements disclosed in my copending application Serial No. 372,829, filed July 23, 1953.

In any of the arrangements described herein, in addition to providing for movement of the load sensing device in the plane of the drawings, it should be noted that motion at right angles to this plane can also be provided. For example, in Fig. 1 the push-pull plate 7 can be of such stiffness laterally that the load cell 3 will follow the motions of member 1 in any horizontal direction. Or, if member 7 is insufficiently strong to do this, or if a simple rod or tube is used for the push-pull action of member 7, then a similar arrangement attached to the structure and operating at right angles to the plane of the figure will serve to cause load cell 3 to follow the movement of the structure in that direction. As above described, Figs. 9 and 10 show how this is accomplished in an actual structure which has been in successful operation for several months.

While I have shown in Figs. 1 through 7 embodiments in which the push-pull members are located in planes below the base of the load cell, this is by no means a restriction but is used for purposes of clarity. In Figs. 12 and 13 I show how the same principle is used where it is desired to have the push-pull member in another plane. Comparison of any of Figs. 1 through 7 with Figs. 12 and 13 will show that the arrangement of the latter is advantageous wherever the angular deflection of the structure is large enough to be of consequence.

In this arrangement, it will be seen that load cell 30 engages member 31 which is slideable relative to base plate 33. Member 31 is tied back to the structure 34 through flexure plate arrangement 32. For stability, it is only necessary that distances c and d be such that there is no danger of overturning. By obvious variation of details, the distance d can be made as large or small as desired within wide limits, so that the line of action of member 32 can be either above or below the point of engagement between load cell 30 and bearing plate 35.

Load cell 30 is here given a rolling base so that it can take up the very slight motion that would result when the structure 34 deflects angularly. Comparison with Fig. 7 shows immediately that the geometrical arrangement of Figs. 12 and 13 will result in greatly reduced rolling action of the load cell. The basic concept, however, is identical and the choice of position of the push-pull member will depend upon many factors affecting the designer's decision, as has been explained above.

It will be noted that I have referred to the motion actuating members such as 7 in Fig. 1 as "push-pull" members without particular limitation as to their design. As already stated such members can be flexure plates, rods, or tubes. They can even be hinge-ended members if desired or any other arrangement which can exert the push-pull action with little or no lost motion in the direction of their action.

In Fig. 14, I show a modification of Fig. 8 in which the push-pull action is effected by two tension rods 25 and 26, both of which are tied back to structure 17. The advantage of this arrangement is simply that the tension rods can be made much less stiff in bending since they are not subject to the possibility of buckling. Such an arrangement can be used with any of the embodiments, of course.

From the foregoing disclosure of the several modifications it is seen that I have provided a very effective means for using load cells in large structural type weighing equipment without in any way impairing the accuracy, sensitivity or responsiveness of the cells regardless of expansion, contraction or deflection of the supported structure.

It will, of course, be understood that various changes in details of construction and arrangement of parts may be made by those skilled in the art without departing from the spirit of the invention as set forth in the appended claims.

I claim:

1. A load cell support for a weighing structure comprising, in combination, a load cell having means responsive to the magnitude of the load supported by it positioned to support at least a portion of the weighing structure, means including a fixed and a movable element for supporting the load cell to allow it to be moved by movements of the weighing structure, said fixed and movable elements both carrying substantially the entire load supported by the load cell and being adapted to move relative to each other, and means connected to the weighing structure and to said movable element for moving the cell relative to said fixed element during said movements.

2. The combination set forth in claim 1 further characterized in that the means for connecting the weighing structure to the movable element includes a flexible force transmitting member one end of which is connected to the structure and the other end to the movable element.

3. The combination set forth in claim 1 further characterized in that the means for connecting the weighing structure to the movable element includes a plurality of flexible force transmitting members disposed substantially at an angle to each other and being disposed substantially parallel to the principal plane of thermal expansion and contraction movements of the structure.

4. The combination set forth in claim 1 further characterized in that the means for supporting the load cell includes a fixed element having a substantially horizontal supporting surface and a movable element interposed between the cell and said surface to move thereon.

5. The combination set forth in claim 1 further characterized in that the means for supporting the load cell includes a member having a horizontal supporting surface and means interposed between the cell and said surface to slide thereon, and the means for connecting the structure to the load cell to move the same upon contraction and expansion of the structure includes a member connected to the weighing structure and to the slideable member.

6. The combination set forth in claim 1 further characterized by the provision of means for effecting pivotal movement of the load cell during normal deflections of the weighing structure under load.

7. The combination set forth in claim 1 further characterized by the provision of a single rounded abutting connection between one end of the load cell and the weighing structure and another single rounded abutting connection between the other end of the load cell and the supporting means whereby the cell is pivotally mounted at each end.

8. The combination set forth in claim 1 further characterized in that the supporting means fixed element includes a vertically extending outer casing, and the movable element includes an internal casing supported upon the upper end of the outer casing and depending into the latter, and means for supporting the load cell near the lower end of said internal casing.

9. The combination set forth in claim 1 further characterized in that the supporting means fixed element includes a vertically extending outer casing having a substantially horizontal sliding surface at its upper end, and the movable element includes a member slidably supported upon said surface and having an inner casing extending downwardly internally of said outer casing with means for supporting the load cell near the lower end of said internal casing, and the means for connecting the weighing structure to the movable element includes a force transmitting member connected to the upper end of said internal casing to cause it to slide on said sliding surface during expansion and contraction of the weighing structure.

10. The combination set forth in claim 1 further characterized in that the supporting means for the load cell includes an anti-friction bearing upon which the movable element is mounted so that the cell moves with the weighing structure during its expansion and contraction.

11. A load cell support for a weighing structure comprising, in combination, a load cell positioned to support at least a portion of a weighing structure, a U-shaped member having outwardly turned upper ends, means for slidably supporting said upper ends, said load cell being supported by said U-shaped member, and means connecting said weighing structure to the U-shaped member to cause the member and load cell to move as a unit with the weighing structure during expansion and contraction thereof.

12. The combination set forth in claim 1 further characterized in that the fixed element of the supporting means includes a vertically extending outer casing having a substantially horizontal sliding surface at its upper end, and the movable element includes a member slidably supported upon said surface and having an inner casing extending downwardly internally of said outer casing with means for supporting the load cell near the lower end of said internal casing, and the means for connecting the weighing structure to the movable element includes a flexible force-transmitting member connected to the upper end of said internal casing to cause it to slide on said sliding surface during expansion and contraction of the weighing structure, said flexible member having axial extent in the direction of force to be transmitted, the axis of said force-transmitting member, said sliding surface, and the point of engagement between said upper end of the load cell and the weighing structure all lying substantially in a single horizontal plane.

13. The combination set forth in claim 1 further characterized in that the means for connecting the weighing structure to the movable element includes an elastically flexible force-transmitting member one end of which is connected to the structure and the other end to the movable element, the elastic axis of said flexible member lying substantially in the same horizontal plane with the point of engagement between the upper end of said load cell and said weighing structure.

14. The combination set forth in claim 1 further characterized in that the means for connecting the weighing structure to the movable element includes an elastically flexible force-transmitting member one end of which is connected to the structure and the other end to the movable element, the elastic axis of said flexible member lying substantially in the same horizontal plane with the point of engagement between the upper end of said load cell and said weighing structure, said fixed and movable elements engaging each other in a substantially horizontal plane which is located below the first-named horizontal plane.

15. The combination set forth in claim 1 further characterized in that the means for connecting the weighing structure to the movable element includes a flexible stay plate force-transmitting member the elastic axis of which lies substantially in a horizontal plane so that it is flexible relative to the vertical deflections of the weighing structure but is relatively rigid against horizontal deflections, thereby to cause the cell to move in any horizontal direction relative to said fixed element during said movements while carrying a vertical load which is small relative to the vertical load carried by said load cell.

References Cited in the file of this patent

UNITED STATES PATENTS

| | | |
|---|---|---|
| 916,818 | Winslow | Mar. 30, 1909 |
| 1,968,988 | Bousfield | Aug. 7, 1934 |
| 1,980,609 | Bousfield | Nov. 13, 1934 |
| 2,063,741 | Hibbard | Dec. 8, 1936 |
| 2,652,241 | Williams | Sept. 15, 1953 |

FOREIGN PATENTS

| | | |
|---|---|---|
| 673,395 | Germany | Mar. 21, 1939 |